Jan. 3, 1961 N. A. MOERMAN 2,967,294

SATURABLE REACTOR SYSTEM FOR INFORMATION STORAGE, COMPARISON AND READ-OUT

Filed Dec. 24, 1956 2 Sheets-Sheet 1

INVENTOR.
NATHAN A. MOERMAN
BY Alfred W. Barber
ATTORNEY

INVENTOR.
NATHAN A. MOERMAN
BY Alfred W. Barber
ATTORNEY

United States Patent Office 2,967,294

Patented Jan. 3, 1961

2,967,294

SATURABLE REACTOR SYSTEM FOR INFORMATION STORAGE, COMPARISON AND READ-OUT

Nathan A. Moerman, Roslyn, N.Y., assignor to Potter Instrument Co., Inc., Plainview, N.Y., a corporation of New York Filed Dec. 24, 1956, Ser. No. 630,232

1 Claim. (Cl. 340—149)

The present invention concerns storage devices and, in particular, methods of and means for utilizing two state saturable reactors for storage of information and for comparing certain information with the stored information.

Reference is made to United States Patent No. 2,886,790 for a disclosure of a two state saturable reactor suitable for use in the systems of the present invention.

Saturable reactors have been used in many ways in the past, as impedance control devices, magnetic amplifiers and the like. In the electronic computer field magnetic cores have been used as memory devices. These magnetic cores are made of "hard" magnetic material, that is magnetic material of high retentivity which when magnetized in a given direction will retain a large part of that magnetism. Information may be stored in such a device by magnetizing the core in one direction. In order to "read out" the information so stored the core is pulsed in the same or the opposite direction. When the read out finds a given previous magnetic state a pulse having energy indicating whether the read out is in the same or opposite direction to the previous magnetic state indicates the information stored. Since the read out changes the state of magnetism of the cores at least in a part of an array, it is termed a destructive read out.

According to the present invention, a saturable reactor made partly of "hard" magnetic material and partly of "soft" magnetic material is used in such a way that read out may be accomplished without affecting the magnetic state and hence the information stored. The particular device or combination of the present invention is a storage device utilizing the non-destructive read out type of two state saturable reactors and a comparison device utilizing saturable reactors of soft magnetic material which may assume a given state under influence of a control signal but which do not retain any information when the control is removed. Information stored in the hard material containing reactors, which may be so-called "square loop" material may be read in over a period of time and stored until utilized. Comparison information is fed to comparison reactors for short periods and an output produced when the instantaneous information in the comparison reactors matches the stored information in the storage reactors. An important characteristic of this system is that information stored in a plurality of square loop reactors must be matched exactly to provide an output. When and only when there is an exact match one by one between the square loop reactors and the comparison soft material reactors will the output be produced. It is also not a matter of degree in the match or the amount of output. There is substantially no output until the match is found and then the output is full output. The basic circuit for accomplishing this is a balanced system in which one or more storage reactors are balanced by a similar number of comparison reactors and an output is produced when the two are balanced indicating that the same information is contained in each.

The present system consumes very little average power.

Since the information in storage takes no power to maintain itself, power need be supplied to the system only during storage and comparison intervals. In this way a duty cycle of as low as .01 percent may be achieved. The R.F. signal, for example, may be supplied in bursts lasting 10 microseconds at intervals of 100,000 microseconds, i.e. only at the instants when a comparison is to be made. No R.F. power is required at the time of information storage and no power is required to maintain the stored information. Also as has been stated the information is not destroyed or altered in any way by the read out but only by means of deliberate resetting.

Accordingly one object of the present invention is to provide a system in which information may be stored by means of saturable reactors in such a way that the information may be read out non-destructively.

Another object is to provide a storage array of storage and comparison saturable reactors of hard and soft magnetic material respectively.

And another object is to provide a system for storing a plurality of bits of information in a digital manner and of matching this information dynamically and of providing definite output when and only when an exact match is achieved one by one between the stored and the dynamic information.

Still another object is to provide a saturable reactor system in which information may be stored in saturable reactors containing hard magnetic material but which may be reset readily.

A further object is to provide a magnetic memory and comparison system which may be easily operated from an electronic binary counter or similar device.

These and other objects of the present invention will be apparent from the detailed description of the invention given in connection with the various figures of the drawing.

Figures 1, 2, 3, 4:
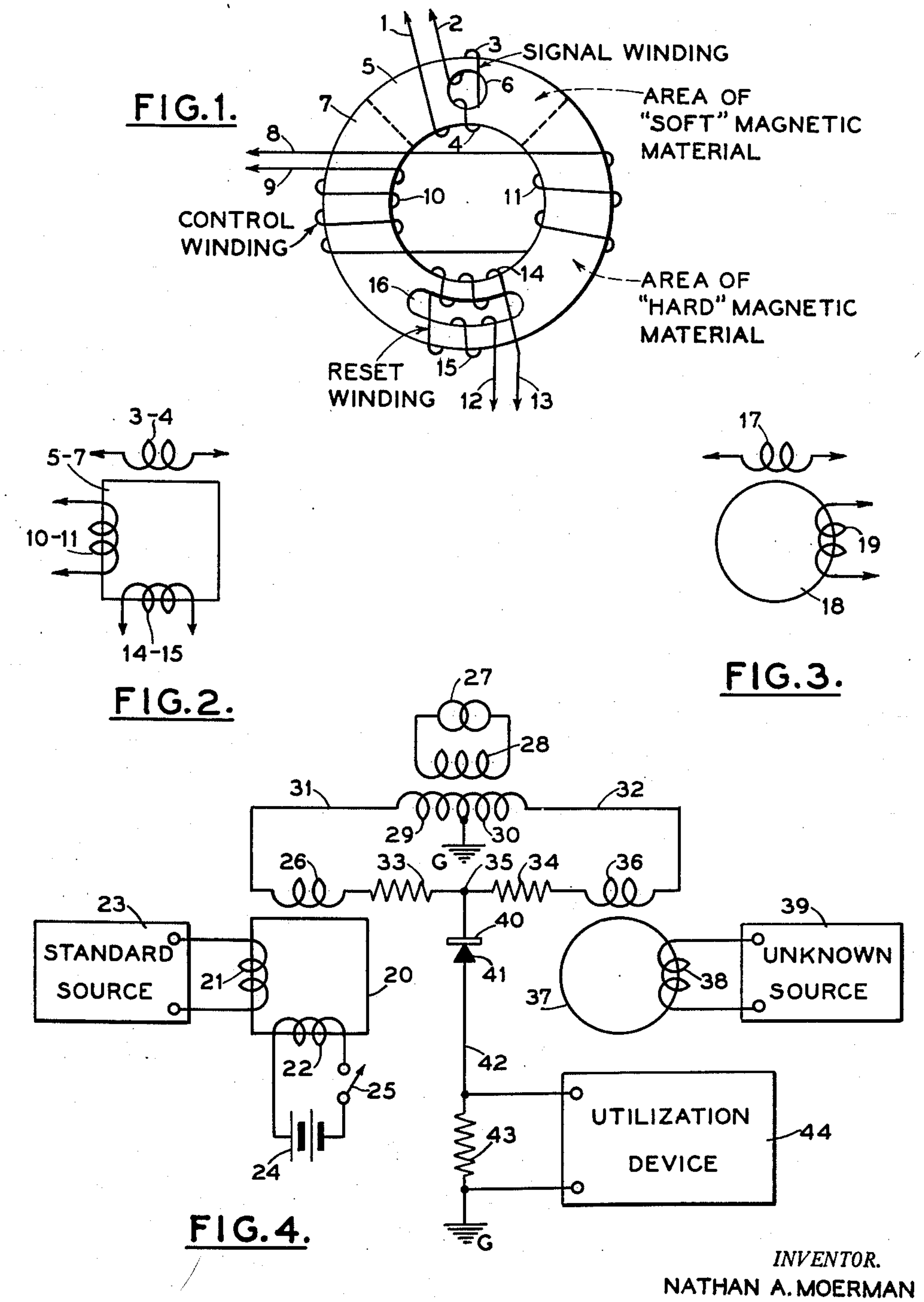
Fig. 1 shows the winding and core arrangement of a hard magnetic material containing saturable reactor with windings suitable for use in the system of the present invention.
Fig. 2 shows a schematic representation of the reactor shown in Fig. 1.
Fig. 3 shows a schematic representation of a reactor comprising soft magnetic material.
Fig. 4 shows a circuit utilizing one hard and one soft saturable reactor device in a balanced circuit according to the present invention.

Fig. 1 shows a magnetic core composed in part of soft magnetic material 7 and in part of hard magnetic material 5. The soft material forms a sector in the annulus of the reactor ring. Around a hole 6 in the soft material is wound the signal winding starting at 1 and passing around one side of the hole to form one winding 4 and around the other side of the hole in the opposite direction to form a second and balanced winding 3 and then out at 2. Around the body of the hard material 7 is wound two windings 10 and 11 of equal turns and wound in the same direction going in at 9 and out at 8 to form a two part control winding. Around hole or slot 16 in the center of the hard material body is wound a balanced winding 14—15 starting at 12 and ending at 13 to form a reset winding for demagnetizing the hard material upon application of a resetting pulse. The use of the two part control winding for magnetizing the hard material 7 upon the application of a control pulse provides more complete and effective magnetization of the hard material. The symmetrical positioning of coils including the balanced signal coil 3—4, the two part control coil 10—11 and the balanced resetting coil 14—15 provides a more efficient and effective system to perform the functions stated.

Fig. 2 shows a schematic representation of the reactor of Fig. 1 showing the hard or square loop magnetic material containing core as the rectangle 5—7, the balanced signal winding as 3—4, the two part control winding as 10—11 and the balanced resetting winding as 14—15.

Fig. 3 shows a schematic representation of a saturable reactor having soft magnetic core material 18, a signal winding 17 and a control winding 19. This reactor may be similar in form to the one shown in Fig. 1 but made entirely of "soft" magnetic material and omitting the reset winding.

Fig. 4 shows a single stage comparison device in which a high frequency signal source 27 feeds balanced secondary coils 29 and 30 through the coupling to primary 28. The thus produced equal and opposite high frequency voltages are applied on one side over leads 31 through signal coil 26 and limiting resistor 33 to common point 35 and on the other side over lead 32 through signal coil 36 and limiting resistor 34 to common point 35.

Signal coil 26 is coupled to square loop core 20 while signal coil 36 is coupled to soft core 37. Coils 26 and 36 are such that when their associated cores 20 and 37 respectively are saturated due to the flow of control current in coils 21 and 38 respectively they are of substantially equal impedance and a bridge circuit then exists with coils 29 and 30 and resistors 33 and 34 and no signal voltage exists between common point 35 and ground G. Coils 26 and 36 also have equal impedance but a much higher impedance when cores 20 and 37 are unsaturated and the bridge circuit is again balanced. Thus substantially no signal voltage exists between point 35 and ground whenever cores 20 and 37 have similar magnetic states, that is, both saturated or both unsaturated. When point 35 is connected through a rectifier 40—41 and resistor 43 to ground G a D.C. control potential will exist across resistor 43 which is applied to a utilization device 44 except when cores 20 and 37 are in the same magnetic state. A standard source feeds control coil 21 and an unknown source 39 feeds control coil 38. For example, a signal to be matched exists in the standard source and across coil 21 so that core 20 is given a predetermined magnetic state. Since core 20 contains hard magnetic material, this magnetic state will continue to exist after the signal from the standard source is removed and the device may be termed a memory device. Various signals may exist in unknown source 39 from time to time, but at any instant that this signal equals the signal initially supplied from the standard source, core 37 will instantaneously assume the same state as that stored by core 20 and no signal will exist between point 35 and ground grid the bias will be instantaneously removed from resistor 43 and the input to the utilization means 44. This circuit then provides a device for storing information and indicating instantaneously when other information matches the stored information.

Figure 5:
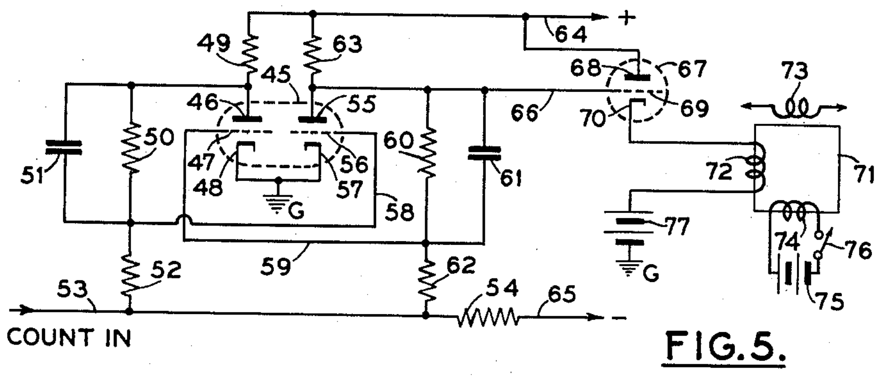
Fig. 5 shows one suitable method of setting a hard magnetic material reactor from a typical binary counter stage.

Fig. 5 shows a binary counter stage coupled to a hard magnetic material core coil for setting in information. A similar coupling is used for coupling a comparison counter stage to the control coil of a soft magnetic material core. The counter stage includes double triode tube 45 with cathodes 48 and 57 heated by a suitable source not shown, grids 47 and 56 and plates 46 and 55 respectively. Cathodes 48 and 57 are connected to ground G. Plate 46 is connected through load resistor 49 to lead 64 to a source of positive potential, not shown, and through resistors 50, 52, and 54 in series to a source of negative potential not shown over lead 65. Resistor 50 is by-passed by a suitable capacitor 51. Plate 55 is connected over load resistor 63 to lead 64 and through resistors 60, 62 and 54 to lead 65. Resistor 60 is by-passed by a suitable capacitor 61. Grid 47 is cross-connected to the junction between resistors 60 and 62 while grid 56 is cross-connected to the junction between resistors 50 and 52. The count is fed in over lead 53 and across common resistor 54. Plate 55 is also connected to grid 69 of coupling tube 67 over lead 66. Plate 68 is connected to positive bias lead 64 and cathode 70 heated by suitable means not shown is connected through control coil 72 and bias source 77 to ground G. When plate 55 conducts grid 69 is at a relatively low potential and cathode 70 is cut-off and no saturating current flows in coil 72. When plate 55 conducts indicating a count of 1 in the binary counter stage, its potential is high causing grid 69 to be high and cathode 70 to conduct passing saturating current through control coil 72. Once core 71 is saturated it will remain saturated thereby storing the count of 1 until current is passed through reset coil 74 by closing switch 76 to pass current from battery 75 through the coil.

Figure 6:
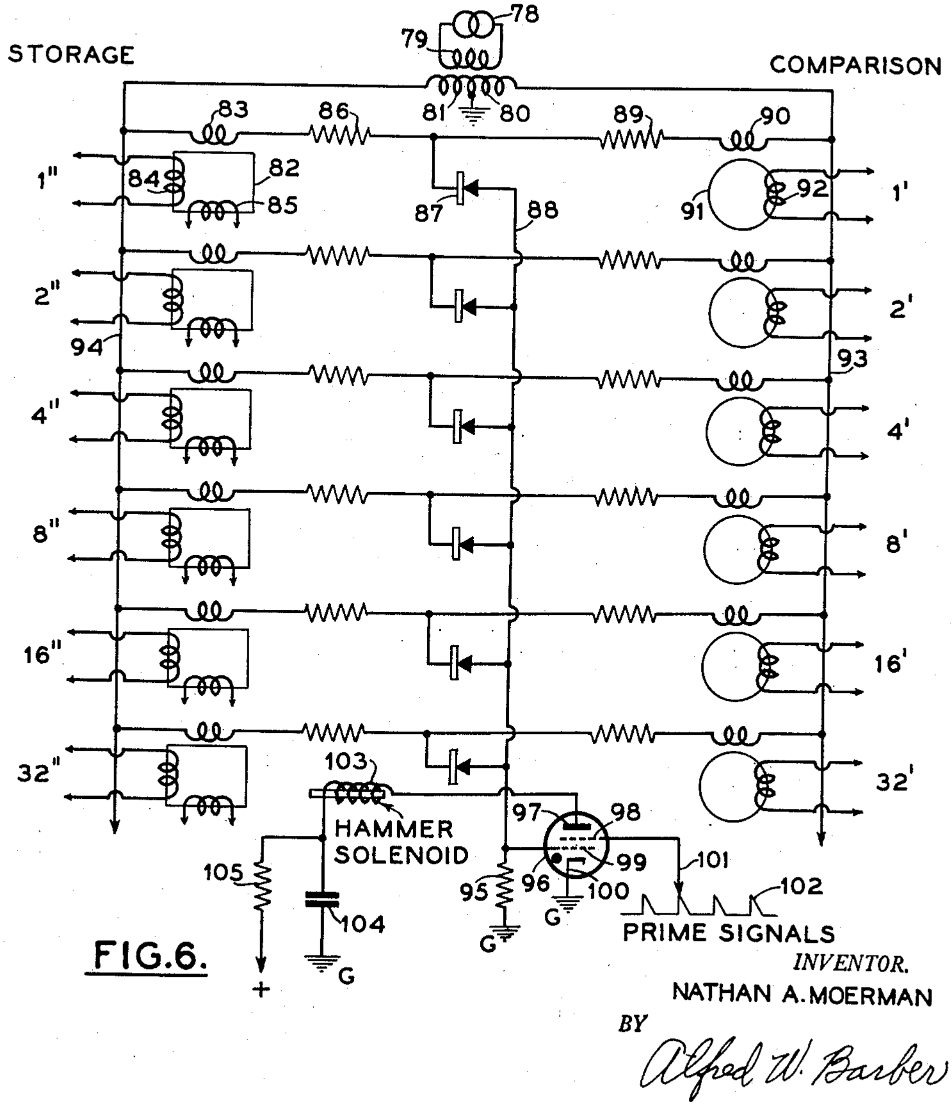
Fig. 6 shows a system employing six stages of hard and soft magnetic material reactors capable of storing and comparing a six digit character according to the present invention.

Fig. 6 shows a complete six bit system whereby any six bit character may be set up and stored and a comparison or search made to find a match. High frequency source 78 feeds a coil system consisting of primary 79 and balanced secondary coils 80 and 81. One secondary 81 feeds six parallel circuits consisting of signal coils 83, etc. in series with resistors 86 etc., while the other secondary 80 feeds the comparison reactor signal coils 90 etc. in series with resistors 89 etc. The junctions between the resistors feeds rectifiers 87 etc. and common bus 88 which in turn feeds common resistor 95 at the grid 99 of thyratron 96. As an example the hard magnetic material containing cores 82 etc. with control coils 84 etc. are fed from sources designated as 1″, 2″, 4″, 8″, 16″ and 32″ representing six binary numbers or six bits of a six bit code. Resetting may be accomplished by energizing resetting coils 85 etc. The comparison cores 91 etc. are to be saturated by control coils 92 etc. from comparison sources designated 1′, 2′, 4′, 8′, 16′ and 32′ representing six binary numbers or six bits of a six bit code. As described above in connection with Fig. 4 when the magnetic states of the comparison cores matches the storage cores no signal will be present on bus 88 and the negative cut off bias which under all other conditions exists across resistor 95 will be removed and thyratron 96 will be fired at the instant primary signals 102 placed on lead 101 by suitable means not shown and hence on second grid 98 exist in coincidence. Thyratron 96 has cathode 100 heated by suitable means not shown and plate 97. Plate 97 feeds some utilization device such as printing hammer solenoids 103. Charge for operating the solenoid is stored in capacitor 104 charged from a positive source not shown through resistor 105.

In review, Fig. 6 shows six hard material containing saturable reactors which may be set up in a pattern or sequence representing any 6 digit number or 6 bit code and thus stored. A comparison may be made instantaneously with 6 soft magnetic material containing saturable reactors and when a match is attained with the stored information the absence of a resultant signal, indicating balance or match, operates a thyratron and an output utilization device.

The invention as shown and described may be varied as will be apparent to those skilled in the art within the spirit and scope of the invention as set forth in the appended claim.

What is claimed is:

In a saturable reactor system, the combination of, a plurality of saturable reactors containing permanent magnet material and each including at least a signal winding for impeding a signal from an interrogation current source, a control winding for saturating said material and a resetting winding for demagnetizing said material, a second plurality of saturable reactions of soft magnetic material equal in number to said first said reactors and each including at least a signal winding for impeding a signal from said interrogation source, and a control winding for saturating the last said material, a plurality of circuits joining one each of said signal windings of said permanent magnet material reactors with a corresponding signal winding of said soft magnetic material reactors, a plurality of rectifiers branched from a common point to each of said circuits for providing an output current to said common point for control of a utilization means as long as saturated and unsaturated conditions of said permanent magnet reactors are mis-matched with saturated and unsaturated conditions of said soft magnet material reactors in accordance with the impedance of the respective signal windings of each.

References Cited in the file of this patent

UNITED STATES PATENTS

| | | |
|---|---|---|
| 2,430,457 | Dimond | Nov. 11, 1947 |
| 2,614,167 | Kamm | Oct. 14, 1952 |
| 2,676,253 | Ayres | Apr. 20, 1954 |
| 2,715,718 | Holtje | Aug. 16, 1955 |
| 2,721,990 | McNaney | Oct. 25, 1955 |
| 2,774,056 | Stafford et al. | Dec. 11, 1956 |
| 2,781,503 | Saunders | Feb. 12, 1957 |
| 2,805,408 | Hamilton | Sept. 3, 1957 |

FOREIGN PATENTS

| | | |
|---|---|---|
| 646,585 | Great Britain | Nov. 22, 1950 |